United States Patent [19]
Maezawa

[11] Patent Number: 5,844,871
[45] Date of Patent: Dec. 1, 1998

[54] OPTICAL DISK TRACK COUNTING APPARATUS AND METHOD FOR IMPROVED TRACK ACCESS

[75] Inventor: Etsuo Maezawa, Tokyo, Japan

[73] Assignee: NEC Corporation, Tokyo, Japan

[21] Appl. No.: 800,177

[22] Filed: Feb. 13, 1997

[30] Foreign Application Priority Data

Feb. 13, 1996 [JP] Japan ................................. 8-025591

[51] Int. Cl.⁶ .................................................. G11B 7/085
[52] U.S. Cl. .......................................... 369/44.28; 369/54
[58] Field of Search .............................. 369/44.25, 44.28, 369/44.29, 54

[56] References Cited

U.S. PATENT DOCUMENTS

| | | | |
|---|---|---|---|
| 5,184,338 | 2/1993 | Shimoda et al. | 369/44.25 |
| 5,193,081 | 3/1993 | Osawa et al. | 369/44.25 X |
| 5,426,625 | 6/1995 | Bui et al. | 269/44.28 X |

FOREIGN PATENT DOCUMENTS

| | | |
|---|---|---|
| 63-60449 | 11/1988 | Japan . |
| 1-277332 | 11/1989 | Japan . |
| 7-93765 | 4/1995 | Japan . |

*Primary Examiner*—W. R. Young
*Attorney, Agent, or Firm*—Foley & Lardner

[57] ABSTRACT

To accurately count the tracks traversed on an optical disk, even in the presence of noise and eccentricity, a track-counting apparatus is provided, this apparatus having an edge-detection circuit that detects the edges of a track-crossing signal and generates an edge-crossing signal, a logical AND circuit that takes the logical AND of the edge-crossing signal and a mirror signal to generate an effective edge signal, a direction-discriminating circuit which switches the logic state of the track-crossing signal based on the direction of movement toward the target track, thereby generating a pulse-discriminating signal, a count pulse separating circuit which, based on this pulse-discriminating signal, separates the effective edge signal into a count-down signal and a count-up signal, and a track counter which counts the number of tracks traversed, based on both the count-down signal and the count-up signal which are generated by the count pulse separating circuit.

4 Claims, 8 Drawing Sheets

OPTICAL DISK TRACK COUNTING APPARATUS AND METHOD FOR IMPROVED TRACK ACCESS

BACKGROUND OF THE INVENTION

1. Field of the Invention

The present invention relates to a track-counting/scanning apparatus of an optical disk apparatus, and more specifically to an optical disk track-counting apparatus which counts the number of tracks a beam spot traverses, and a method thereof.

2. Description of the Related Art

When causing a beam spot that is aimed onto an optical disk onto which are formed concentric circular or helical tracks to jump tracks in the radial direction with respect to the disk, so as to access a target track, a method used is that of determining the number of tracks to be traversed from the current address track to the target address track beforehand, and controlling the velocity of the beam spot while counting the number of traversed tracks using a track-counting apparatus so as to access the target track.

In the above case, the track-counting apparatus that is used must be able to detect the target track with high accuracy, even if eccentricity of the optical disk, for example, causes the beam spot to scan in a reverse direction.

In a conventional address retrieval operation performed on an optical disk, the method of performing address scanning of an optical disk to access a target address was to calculate beforehand the number of tracks from the current address to the target address, the number of traversed tracks being counted as speed control was performed of the beam spot, this method requiring the accurate counting of tracks. In general, the method of counting the traversed tracks is to use by using a track-count pulse signal that is obtained by waveshaping a tracking error signal which includes traverse information.

However, because an optical disk exhibits a center offset that is at least within the standard specifications, and the rotating shaft of the turntable of the optical disk apparatus inevitably has a center offset, and thus when an optical disk is mounted, these eccentricities combine to cause multiplied eccentricity.

On the other hand, because of wear existing in a traversing mechanism of the optical pickup, at the start of the track seeking scan in the stopped condition or immediately before completion of the seek operation, when coincidence of the relative speed of the beam spot and the target speed causes the controlled speed to be zero, there are cases in which it is difficult to quickly track to the controlled speed from the condition in which the optical pickup is stopped, for example.

Therefore, at the start and completion of the track seeking scan, when the scanning speed is slow, if the effect of eccentricity causes the beam spot to move in a direction away from the target track, because traversed tracks are counted in duplicate, it is not possible to count the traveled tracks accurately, thereby causing the problem of deterioration in access accuracy.

To solve this type of problem, in Japanese Examined Patent Publication (KOKOKU) No. 63-60449 and in Japanese Unexamined Patent Publication (KOKOKU) No. 1-277332, technology is disclosed whereby, from a tracking error signal and a playback signal, the track traversing direction is detected, and the number of traversed tracks are counted.

Figure 6:
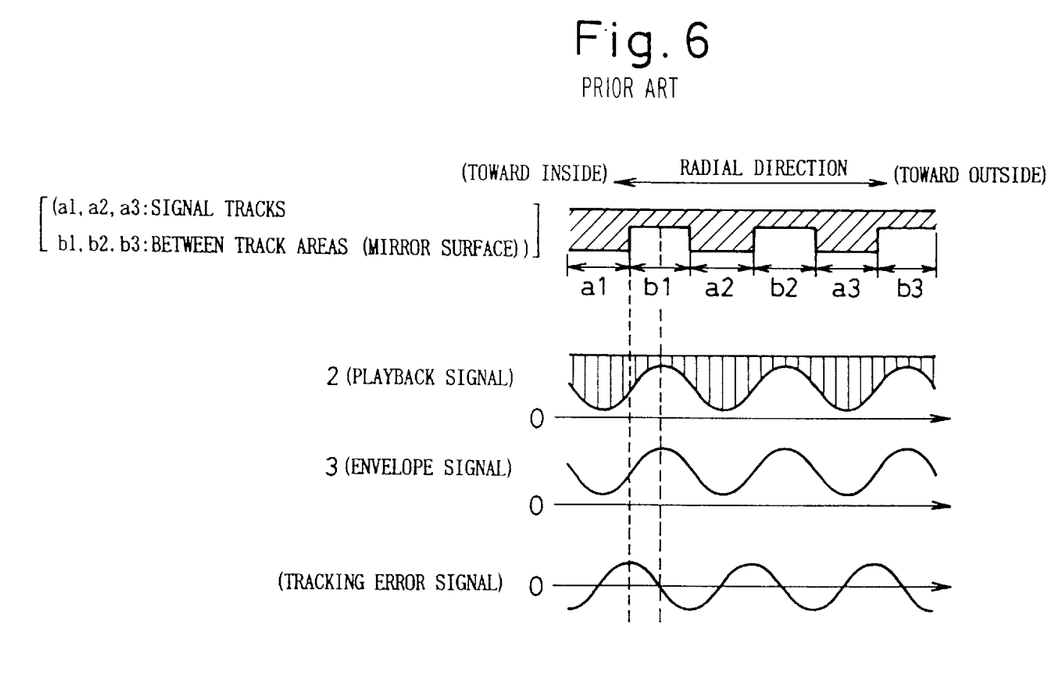
FIG. 6 is a waveform diagram which shows the relationship between the tracking error signal and the mirror signal of an optical disk.

FIG. 6 is a waveform diagram that shows the relationship between the tracking error signal and playback signal of an optical disk, this drawing illustrating the relationship of the tracking error signal and playback signal and the signal track of a surface of the disk and the mirror surface between adjacently arranged tracks on the disk surface.

In contrast to the tracking error signal, which is at a peak at the edge formed between a signal track and the mirror surface between signal tracks, the envelope signal which is the envelope detected from the playback signal is at a peak at the center parts of each of the signal tracks, and the center part of each of the area formed between the adjacently arranged signal tracks.

Next, the optical disk track-counting apparatus disclosed in the Japanese Examined Patent Publication (KOKOKU) No. 63-60449 will be described, with reference made to relevant drawings.

Figure 7:
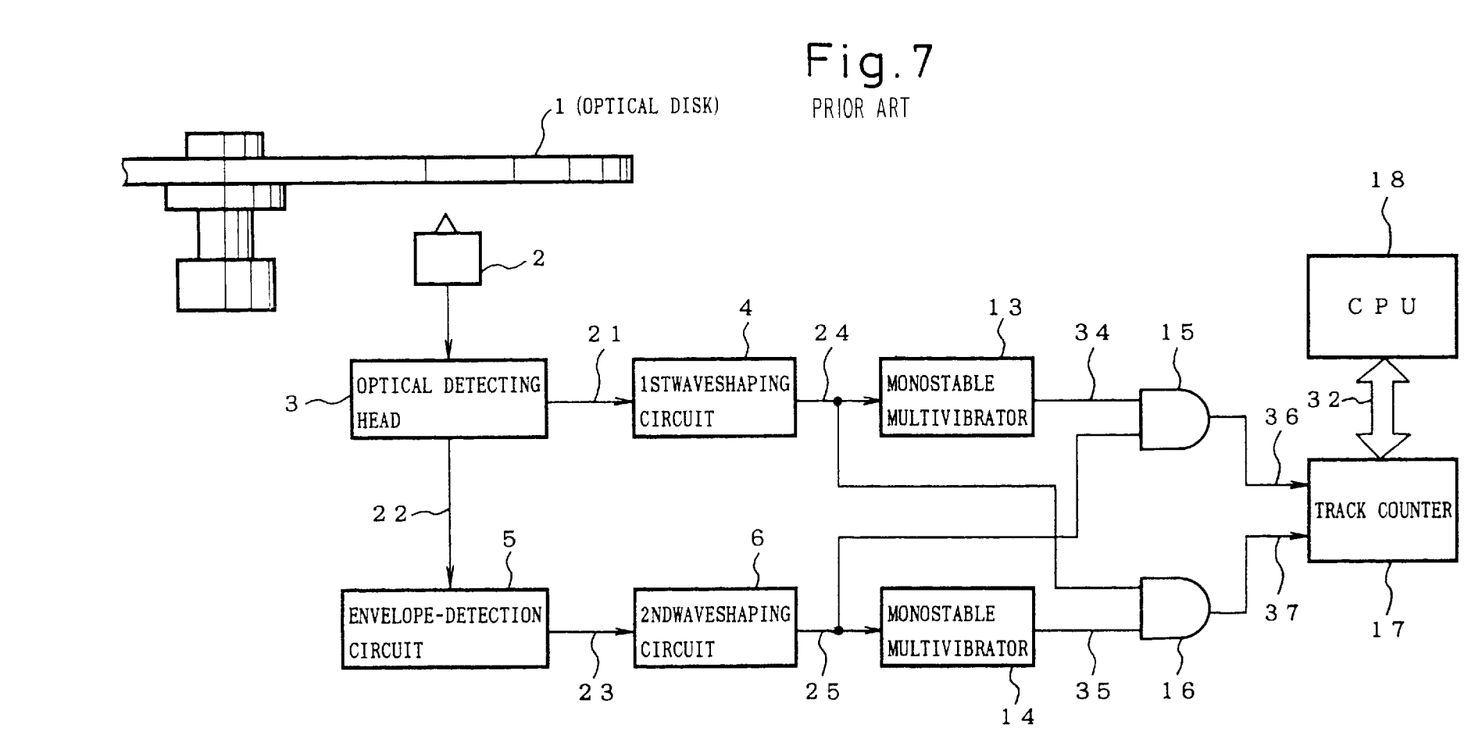
FIG. 7 is a block diagram which shows a track-counting apparatus for an optical disk in the past.
Figure 8:
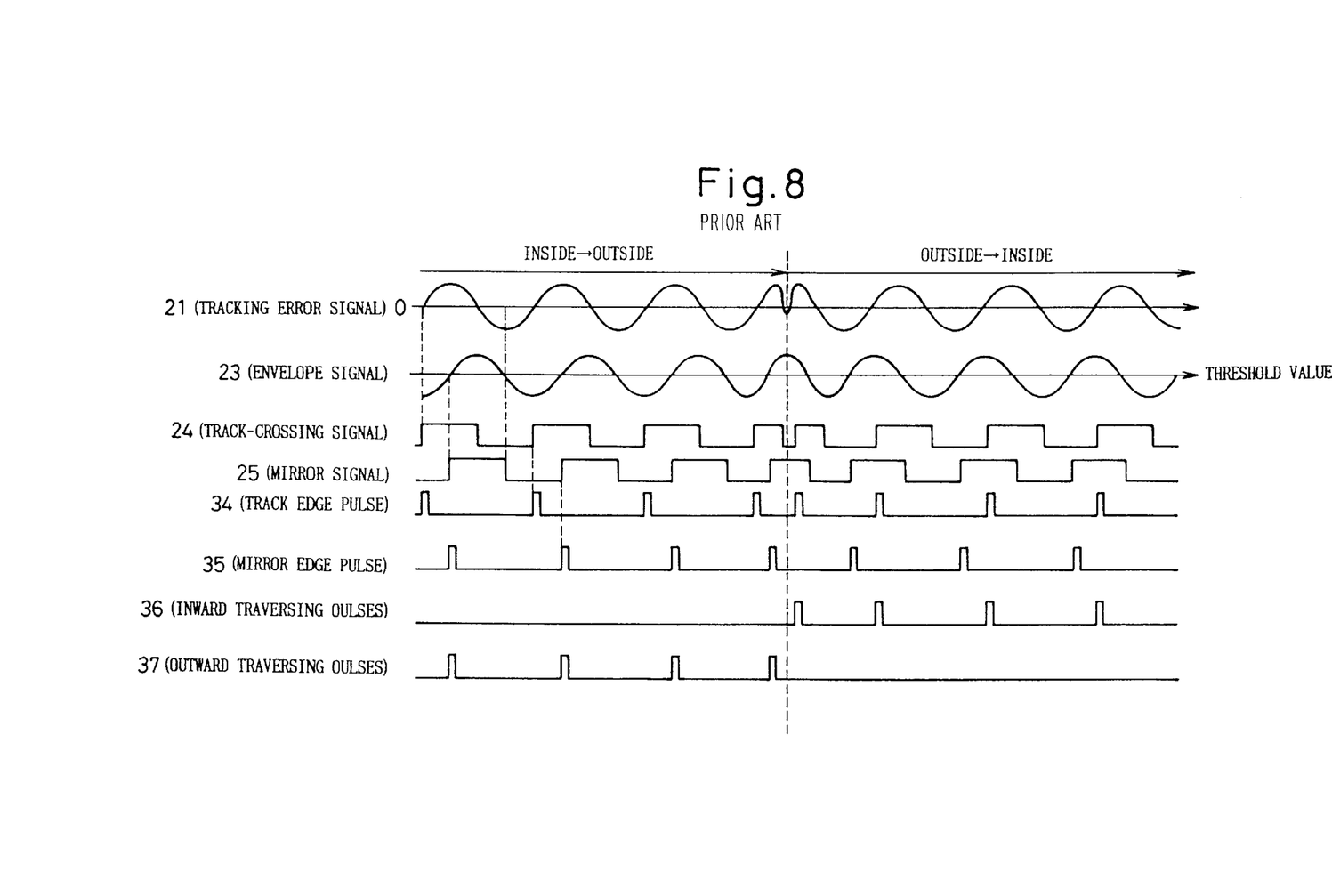
FIG. 8 is a waveform timing diagram which shows the operation of various parts of the optical disk track-counting apparatus shown in FIG. 7 when eccentricity is detected.

FIG. 7 is a block diagram which shows the track-counting apparatus for an optical disk in the past, and FIG. 8 is a timing diagram which shows the operational waveforms at the time of eccentricity detection in the optical disk track-counting apparatus which is shown in FIG. 7.

An optical pickup 2 receives reflected light caused by a beam spot that was shone onto the optical disk 1, using a light sensor, and head amplifier 3 converts the output signal from the optical sensor using an internal matrix circuit to a playback signal 22 and a tracking error signal 21.

The Envelope detection circuit 5 detects the envelope of the playback signal 22 and generates the required envelope signal 23. The waveshaping circuit 6 compares the envelope signal 23 with a prescribed threshold value, and generates the mirror signal 25. Another waveshaping circuit 4 compares the tracking error signal 21 using the zero level, and generates the track-crossing signal 24.

The monostable multivibrator 13 is triggered on the rising edge of the track-crossing signal 24, and generates the track edge pulse 34. The logical product (AND) of this track edge pulse 34 and the mirror signal 25 is taken by the AND gate 15, thereby deriving the inward-traversing pulse 36.

The monostable multivibrator 14 is triggered on the rising edge of the mirror signal 25, and generates the mirror edge pulse 35, the logic product (AND) of this mirror edge pulse 35 and the track-crossing signal 24 being taken by the AND gate 16, thereby generating the outward-traversing pulse 37.

Therefore, if the inward-traversing pulse 36 is input to the track counter 17 count-up clock input and the outward-traversing pulse 37 is input to the track count 17 count-down clock input, the count output 32 of the track counter 17 counts the net number of tracks traversed from the outside toward the inside of the disk in the radial direction.

In the technology disclosed in Japanese Unexamined Patent Publication (KOKAI) No. 1-277332, a head movement speed signal in integrated, the logical product of a comparison signal and a non-compensated track count pulse being taken, this logical product being shaped to form a one-shot pulse signal which is used as the integration reset signal and also as the track-counting pulse.

The first problem in the prior art is that when the scanning speed is slow, such as at the start or completion of a track seeking scan, eccentricity causes duplicate counting of traversed tracks, this preventing the accurate counting of traversed tracks.

The reason for this is that the track-crossing signal is counted without consideration given to the direction that the beam spot is traveling with respect to the optical disk.

The second problem in the prior art is that, in the technology disclosed in Japanese Examined Patent Publication (KOKOKU) No. 63-60449, when an extraneous pulse other than traverse information occurs on the track-crossing signal or mirror signal it is not possible to count the number of traversed tracks accurately.

The reason for this is that when variation in reflectivity which is dependent upon the disk material, track shape, and location on the data-recording surface, cause noise to be generated on the tracking error signal and envelope signal, an extraneous pulse occurs on the track-crossing signal and mirror signal after waveshaping.

The third problem in the prior art is that in the technology disclosed in Japanese Unexamined Patent Publication (KOKAI) No. 1-277332, when noise is generated on the track error signal, an extraneous pulse is generated on the track-crossing signal, thereby preventing accurate counting of the number of tracks.

The reason for this is that not only is a high-accuracy means required for detecting the head movement speed signal, but also when the reset timing of the integration circuit is moved forward and back by the effect of noise, it is not possible to obtain an accurate window signal.

SUMMARY OF THE INVENTION

The present invention is directed to solve the above-noted problems in the prior art, and has as an object the provision of an optical disk track-counting apparatus in which the direction of movement of the beam spot caused by eccentricity arising from off-center of the optical disk and off-center of the turntable is detected, enabling accurate counting of the traversed tracks and highly accurate access, and which even in the case in which noise occurs on both the tracking error signal and mirror signal, generates accurate track counting pulses by means of a simple circuit configuration.

Another object of the present invention is to provide a method for counting the traversed track number so that an accurate track counting operation can be easily carried out.

To attain the above-mentioned objects of the present invention, an an optical disk track-counting apparatus of the present invention basically has the following technical conception in that the track-counting apparatus for an optical disk, comprising an optical detecting head means which detects light reflected from an optical disk, a first waveform-generating circuit means connected to the head means and which detects a tracking-error signal showing a skew of a beam spot from a track, from a playback signal output from the head means and generates a track-crossing signal by binary quantization of the tracking-error signal at the point of zero crossing of the tracking error signal, a second waveform-generating circuit means connected to the head means and which generates, from the playback signal output from the head means, a mirror signal that indicates a mirror-surface area between tracks of the optical disk, a track counter means connected to the second waveform-generating circuit means and which counts the number of tracks traversed by a spot beam which strikes a surface of a optical disk, when it is moved in a radial direction of the optical disk, in response to both the track-crossing signal and the mirror signal, and wherein the track counter means further comprises, an edge-detection circuit means which detects an edge of the track-crossing signal and generates an edge-crossing signal, a logical product circuit means which takes the logical product of the edge-crossing signal generated by the edge-detection circuit means and the mirror signal, which generates an effective edge signal, and a counting means for counting the number of tracks traversed by the spot beam in response to the effective edge signal.

DESCRIPTION OF THE PREFERRED EMBODIMENTS

Preferred embodiments of the present invention will be described in detail below, with reference being made to the relevant accompanying drawings.

Figure 1:
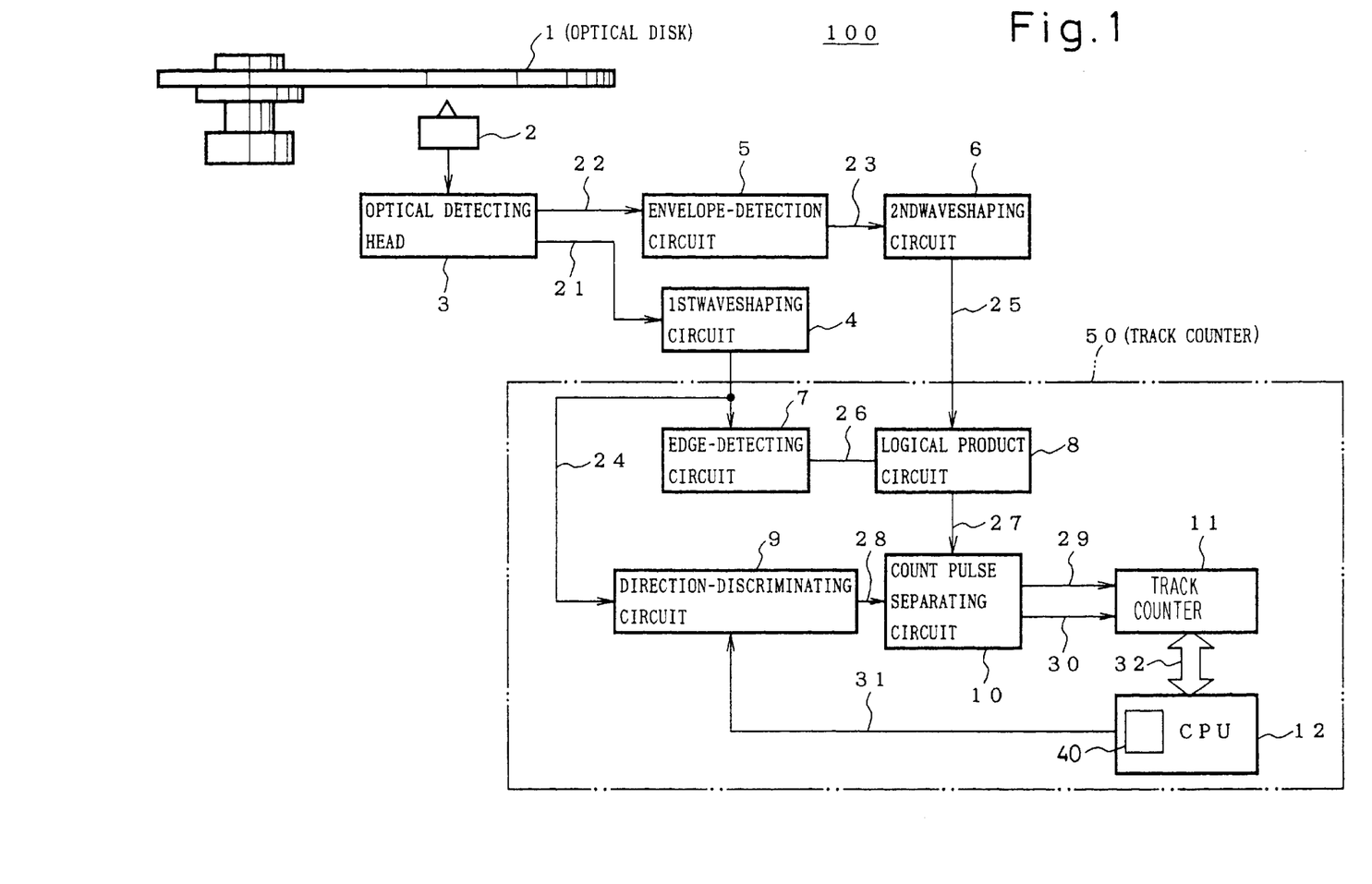
FIG. 1 is a block diagram which shows an embodiment of an optical disk track-counting apparatus according to the present invention.

FIG. 1 shows a block diagram indicating a basic construction of one of the embodiment of the present invention.

In that a track-counting apparatus for an optical disk 100 having the following construction is illustrated.

Namely, the apparatus 100 which comprised an optical detecting head means 2 which detects light reflected from an optical disk 1, a first waveform-generating circuit means 4 connected to the head means 2 and which detects a tracking-error signal 21 showing a skew of a beam spot from a track, from a playback signal output from the head means 2 and generates a track-crossing signal 24 by binary quantization of the tracking-error signal 21 at the point of zero crossing of the tracking error signal 21, and wherein the first waveform-generating circuit means 4 is connected to a track counter means 50, a second waveform-generating circuit means 6 connected to the head means 2 and which generates, from the playback signal output from the head means 2, a mirror signal 25 that indicates a mirror-surface area between tracks of the optical disk 1, a track counter means 50 connected to the second waveform-generating circuit means 6 and which counts the number of tracks traversed by a spot beam which strikes a surface of a optical disk 1, when it is moved in a radial direction of the optical disk 1, in response to both the track-crossing signal 24 and the mirror signal 25, and wherein the track counter means 50 further comprises, an edge-detection circuit means 7 which detects an edge of the track-crossing signal 24 and generates an edge-crossing signal 26, a logical product circuit means 8 which takes the logical product of the edge-crossing signal 26 generated by the edge-detection circuit means 7 and the mirror signal 25, which generates an effective edge signal 27, and a counting means 11 for counting the number of tracks traversed by the spot beam in response to the effective edge signal 27.

In optical disk track-counting apparatus 100 according to the present invention, one of the characteristic features thereof is that the number of traversed tracks is counted based on an effective edge signal 27 which is the logical product of the edge-crossing signal 26 obtained from the track-crossing signal 24 and the mirror signal 25. Therefore, even if the mirror signal 25 includes noise, this noise does not appear in the effective edge signal 27. (refer to FIG. 5)

In addition, in the present invention, another one of the characteristic features thereof is that responsive to the seek direction, the effective edge signal 27 is distributed among traversing track-counting pulses for each individual direction, these being counted by an up/down counter means 11.

Therefore, even if noise occurring on the tracking error signal 21 causes an unwanted pulse on the track-crossing signal, this either does not appear in the effective edge pulse, or, if it does appear, because it appears in both the count-up signal and count-down signal (refer to FIG. 4), the pulses caused by noise are canceled out within the counter, so that the number of traversed tracks is counted without being influenced by noise. By virtue of this pulse distribution, it is possible to perform track counting free from the influence of beam spot position skew caused by eccentricity.

More specifically, the present invention features an edge detection means 7 which generates a pulse at the edge of the track-crossing signal 24 and generates the edge-crossing signal 26, a logical product means 8 which generates the effective edge signal 27 from the logical product of the mirror signal 25 and the edge-crossing signal 26, a direction-discriminating means 9 which generates a pulse-discriminating signal by changing the polarity of the track-crossing signal in accordance with the seek direction which is determined by a seek-direction determining means 40 which can be provided, for example, in CPU 12, and a count pulse separating means 10 which generates, according to the polarity of the pulse-discrimination signal 28, separates the effective edge signal 27 and generates the count-down pulse 29 and count-up pulse 30.

According to the present invention, during a track seeking operation with respect to an optical disk, even if noise causes an extraneous pulse on both the track-crossing signal and the mirror signal which are generated from the track error signal and the playback signal, it is possible to accurately count the traversed tracks, using a simple circuit configuration.

The further specific means used to solve the above problems in the present invention are as follows.

The present invention has a first waveform-generating circuit means 4 which generates a track-crossing signal 24 by binary quantization of the tracking-error signal which indicates from the reflected light from the optical disk 1 that there is skew from the track at the point of zero crossing of the tracking error signal, a second waveform-generating circuit means 6 which generates, from the envelope of the playback signal from the reflected light from the optical disk 1, a mirror signal 25 that indicates the mirror-surface area between tracks of the optical disk 1, and a track counter means 50 which, based on a prescribed effective edge signal 27 that is responsive to both the track-crossing signal and the mirror signal, counts the number of tracks traversed by the spot beam, which strikes the surface of the optical disk, in the radial direction of the optical disk.

The track counter means 50 further has an edge-detection circuit 7 which detects an edge of the track-crossing signal 24 and generates an edge-crossing signal 26, and a logical product (AND) circuit 8 which takes the logical product of the edge-crossing signal 26 generated by the edge-detection circuit 7 and the mirror signal 25, and which generates the effective edge signal 27.

The above-noted track counter means 50, further has a direction-discriminating circuit means 9 which, based on the seek direction of the beam spot, changes the logical state of the track-crossing signal 24 to generate the pulse-discriminating signal 28, and a count pulse separating circuit 10 which, based on the pulse-discriminating signal 28 that is generated by the direction-discriminating circuit 9, separates the effective edge signal 27 into a count-down signal 29 and a count-up signal 30, the track counter means 50 having a counter means 11 which counts the number of traversed track based on both the count-down signal and the count-up signal generated by the count pulse separating circuit.

The direction-discriminating circuit 9 is controlled by a seek-direction determining means 40 in that the seek direction is defined by judging from the target track and the current track position, and outputs a seek direction signal to the above-noted direction-discriminating circuit.

The seek-direction determining means 40 may be provided in the CPU 12.

Figure 2:
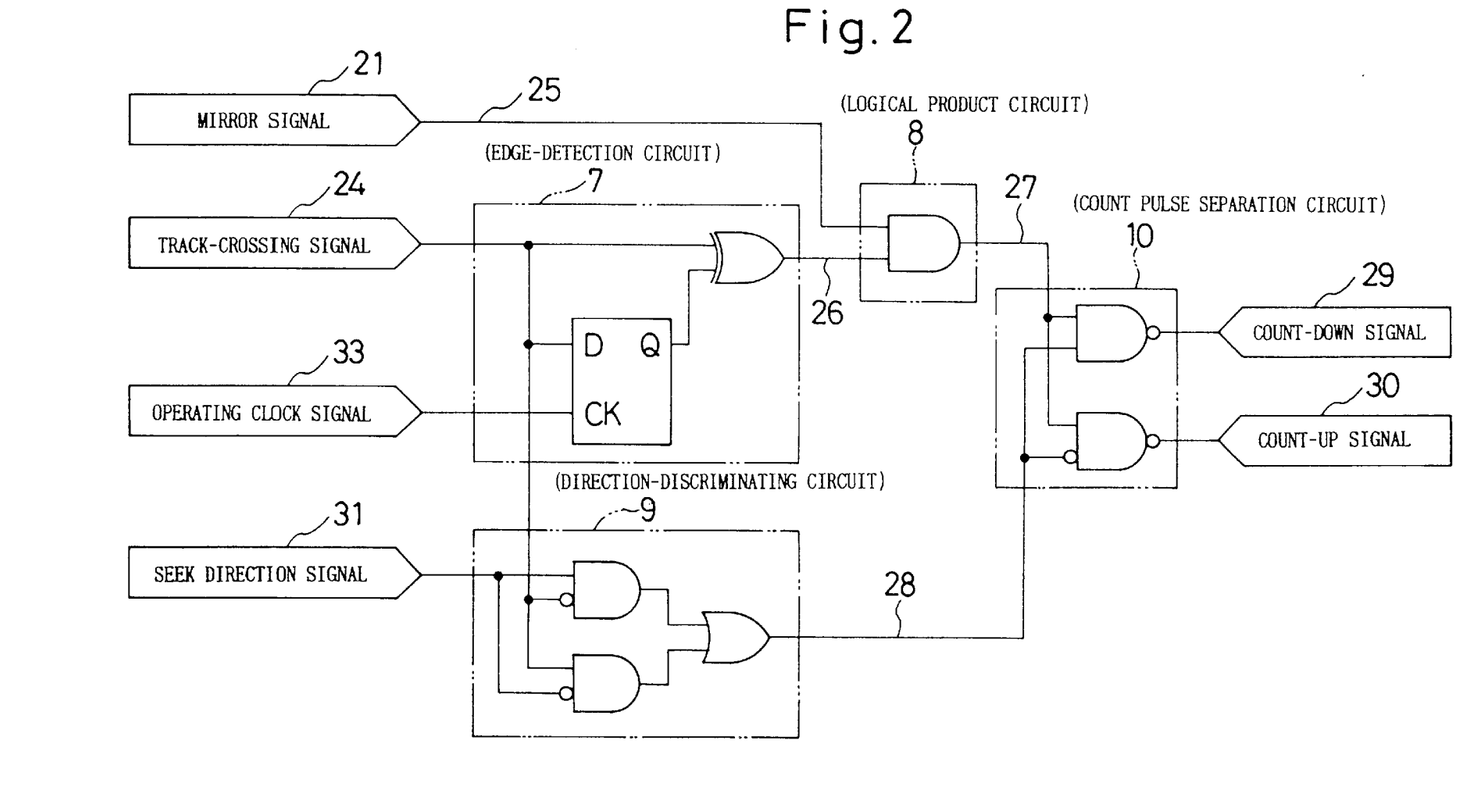
FIG. 2 is a logic circuit diagram which shows an embodiment of an optical disk track-counting apparatus according to the present invention.

FIG. 2 is a logic circuit diagram which shows an embodiment of an optical disk track-counting means 50 according to the present invention.

The construction and its operation of the track-counting means 50, of the present invention will be explained hereunder with reference to FIGS. 1 and 2.

As shown in FIGS. 1 and 2, an optical pickup 2 receives the reflected light from a beam spot that is shone onto an optical disk 1, using a light sensor, and a head amplifier 3 converts the output signal of the light sensor to a playback signal 22 and a tracking error signal 21, by means of an internal matrix circuit. An envelope-detecting circuit 5 detects the envelope of the playback signal 22, and generates a desired envelope signal 23.

A second waveshaping circuit means 6 compares the envelope signal 23 using a prescribed threshold value, and generates a mirror signal 25.

Another first waveshaping circuit means 4 compares the tracking error signal with the zero level, and generates a track-crossing signal 24.

An edge-detection circuit 7 causes the generation of a pulse on both edges of the track-crossing signal 24, and generates the edge-crossing signal 26. A logical product (AND) circuit 8 takes the logical product (AND) of the mirror signal 25 and the edge-crossing signal 26 and generates the effective edge signal 27.

From the current address and the target address, A CPU 12 generates a seek direction signal 31 that indicates either inward seeking or outward seeking, and also calculates the number of tracks traversed and generates the target count data 32.

For example, if the target track is toward the outside with respect to the current track, the seek direction signal 31 is set to a high level, and if the target track is toward the inside with respect to the current track, the seek direction signal 31 is set to a low level.

A direction-discriminating circuit 8 switches the polarity of the track-crossing signal 24 according to the seek direction signal 31, thereby generating a pulse-discriminating signal 28.

A count pulse separating circuit 10 separates the effective edge signal 27 according to the polarity of the pulse discriminating-signal 28, thereby generating a count-down signal 29 which indicates traverse toward the target track, and a count-up signal 30 which indicates traverse toward the target track in the opposite direction.

A track counter 11, after reading in target count data 32 before the start of the scan, performs up/down counting in accordance with the count-up signal 30 and the count-down signal 29, thereby generating the count data 32, which is output to the CPU 12.

Figure 3:
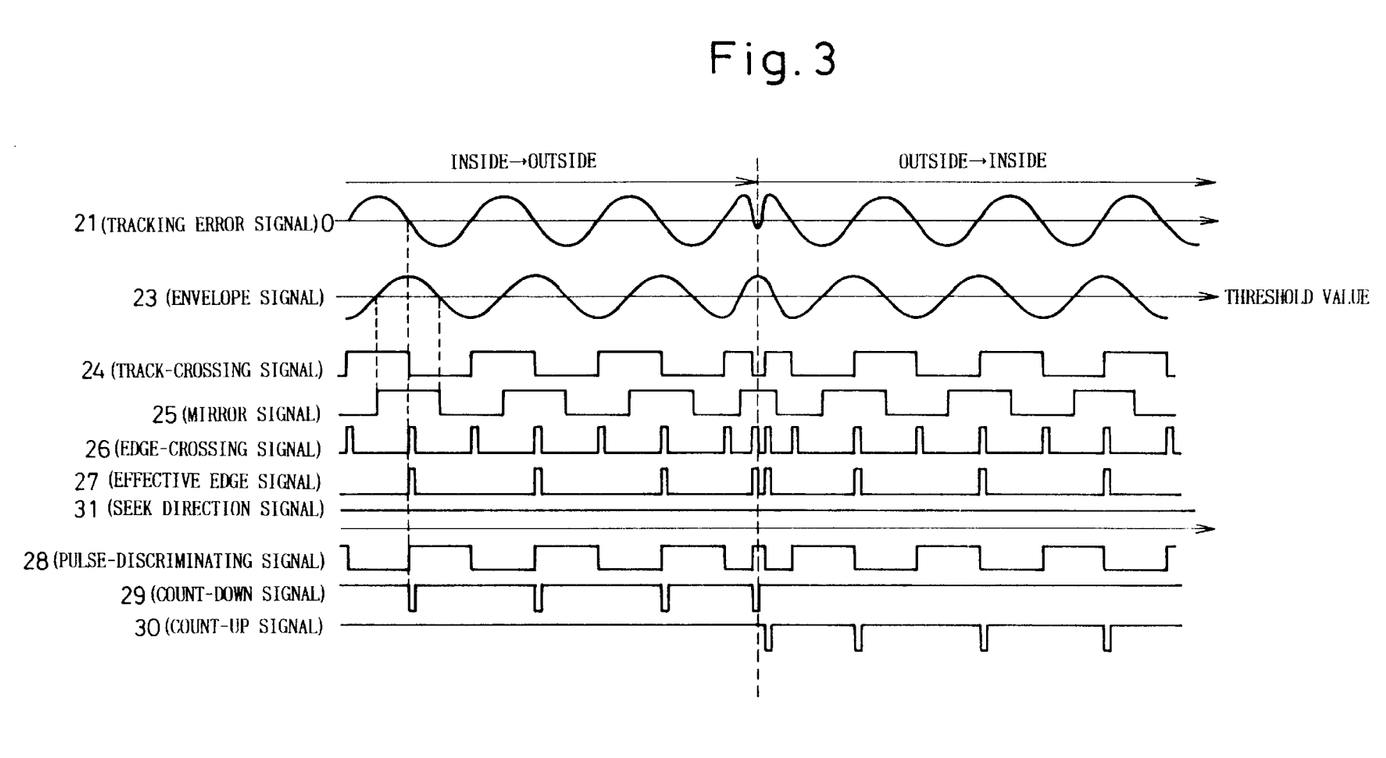
FIG. 3 is a waveform timing diagram which shows the operation of the logic circuit of FIG. 2 with respect to eccentricity.
Figure 4:
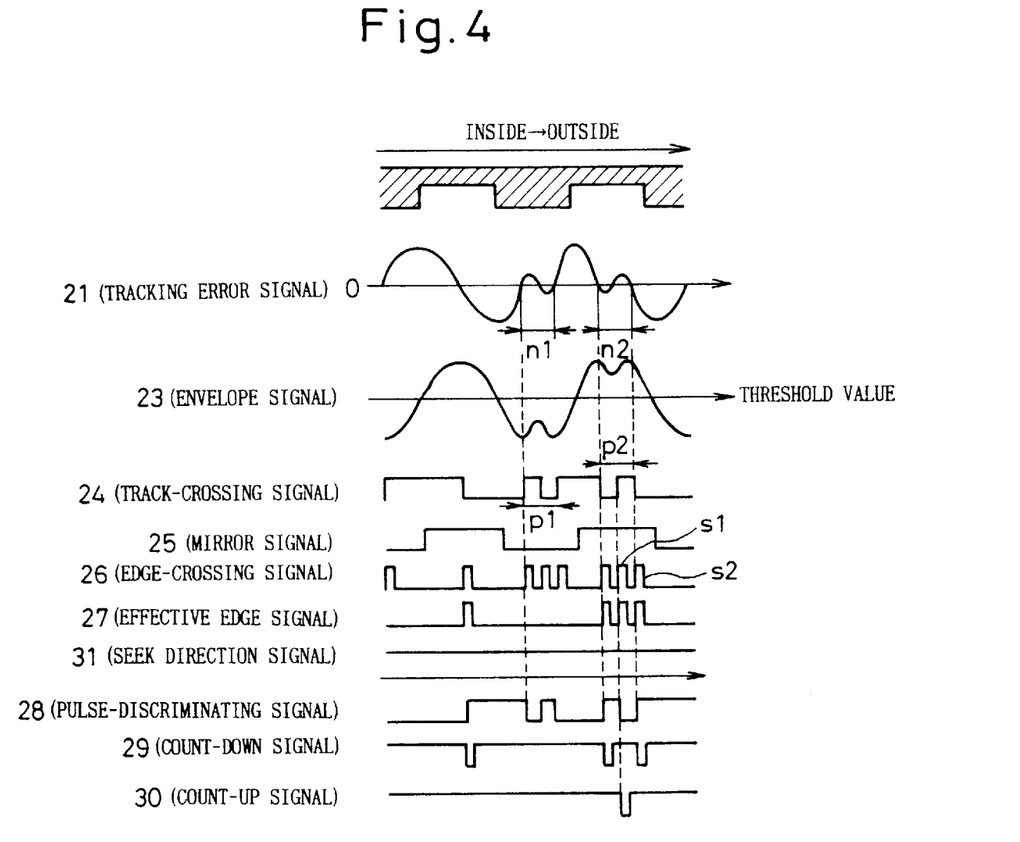
FIG. 4 is a waveform timing diagram which shows the operation of the logic circuit of FIG. 2 with respect to noise on the tracking error signal.
Figure 5:
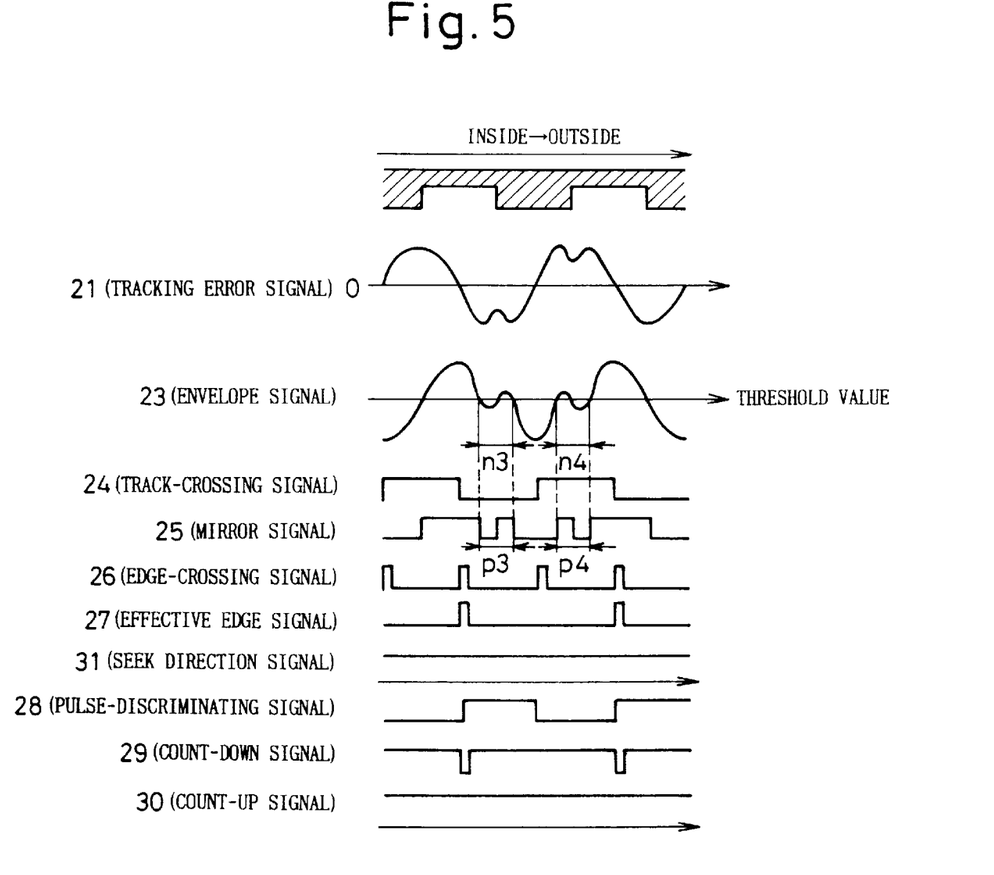
FIG. 5 is a waveform timing diagram which shows the operation of the logic circuit of FIG. 2 with respect to noise on the mirror signal.

FIG. 3 is a timing diagram which shows the operation of the logic circuit which is shown in FIG. 2 with respect to eccentricity, FIG. 4 is a timing diagram which shows the operation of the logic circuit which is shown in FIG. 2 with respect to tracking error signal noise, and FIG. 5 is a timing diagram which shows the operation of the logic circuit which is shown in FIG. 2 with respect to mirror signal noise. The operation of an embodiment of the present invention will now be described in detail, with reference to these drawings, FIG. 3 through FIG. 5.

As shown in FIG. 3, assuming that the direction of seeking is from the inside to toward the outside, if the tracking error signal 21 and the envelope signal 23 are obtained, from these the track-crossing signal 24 and mirror signal 25 are generated.

The effective edge signal 27 is obtained by means of the logical product of the edge-crossing signal 26, which is created at the rising and falling edges of this track-crossing signal 24, and the mirror signal 25.

Since the seek direction is outward, the seek direction is set to high, so that the pulse-discriminating signal 28 is the inversion of the track-crossing signal 24. The effective edge signal when this pulse-discriminating signal 28 is high is taken as the count-down signal 29, and the effective edge signal when this pulse-discriminating signal 28 is low is taken as the count-up signal 30.

In the case in which noise unrelated to traverse information occurs on the tracking error signal 21 and envelope signal, an extraneous pulse might occur on the track-crossing signal and the mirror signal 25. For example, as shown in FIG. 4, if noise signals n1 and n2 which cross the threshold level of the tracking error signal 21 occur, the extraneous pulses p1 and p2 occur on the track-crossing signal 24.

For this reason, the extraneous pulses s1 and s2 occur on the edge-crossing signal 26, and while it appears that the extraneous pulses s1 and s2 will remain, because the pulses are separated by the pulse-discriminating signal 28 into the count-down signal 29 and the count-up signal 30, the extraneous pulses are canceled out within the track counter 11, the result being accurate counting of the number of traversed tracks.

As shown in FIG. 5, in the case in which the noise signals n3 and n4 which cross the threshold level of the envelope signal 23 occur, the extraneous pulses p3 and p4 occur on the mirror signal 25. However, the extraneous pulses on the mirror signal 25 do not appear on the effective edge signal 26, so that they do not affect the counting pulses.

In this manner, in a track-counting apparatus for an optical disk according to the present invention, by counting the number of tracks traversed in the seek direction by means of the count-down signal 29 and the number of tracks in the opposite direction by means of the count-up signal 30, it is possible to perform accurate counting of the number of traversed tracks.

As explained above, the track-counting apparatus for an optical disk of the present invention has the technical feature such that the track counter means further comprises a seek direction discriminating circuit means which determines a seek direction of said head means by judging from a target track and a current track position of said head means.

Moreover, it has further technical feature such that the track counter means further comprises a direction discriminating circuit means connected to the first waveform-generating circuit means and the seek direction discriminating circuit means and which generates pulse-discriminating signal from the track-crossing signal in response to an output of the seek direction discriminating circuit means.

And further it has separate technical feature such that the track counter means further comprises a count pulse separating circuit means connected to the logical product circuit means and the direction discriminating circuit means and which separates the effective edge signal into a count-down signal and a count-up signal, in response to the pulse-discriminating signal output from the direction discriminating circuit means so as to be supplied to the counting means.

On the other hand, the method for counting track number for an optical disk of the present invention is defined, for example, by the following steps such that utilizing a track-counting apparatus comprising an optical detecting head means which detects light reflected from an optical disk, a first waveform-generating circuit means connected to said head means and which detects a tracking-error signal showing a skew of a beam spot from a track, from a playback signal output from the head means and generates a track-crossing signal by binary quantization of the tracking-error signal at the point of zero crossing of the tracking error signal, a second waveform-generating circuit means connected to the head means and which generates, from the playback signal output from the head means, a mirror signal that indicates a mirror-surface area between tracks of the optical disk and a track counter means connected to the second waveform-generating circuit means and which counts the number of tracks traversed by a spot beam which strikes a surface of a optical disk, when it is moved in a radial direction of the optical disk, in response to both the track-crossing signal and the mirror signal, wherein the method comprises the steps of;

generating a edge-crossing signal by detecting a an edge of a track-crossing signal;

generating an effective edge signal by taking the logical product of the edge-crossing signal and the mirror signal;

separating the effective edge signal into a count-down signal and a count-up signal, in response to information representing seek-direction of the optical head means; and counting number of tracks traversed by the head means in a radial direction of the optical disk utilizing at least one of the count-down signal or the count-up signal.

As described in detail above, according to a optical disk track-counting apparatus according to the present invention, in seeking a track of the disk in the radial direction, even if eccentricity of the optical disk or the like causes the beam spot to reverse its scanning direction, by counting the number of tracks on the optical disk traversed by up/down counting of a track count pulse, it is possible to perform accurate counting, thus enabling accurate seeking of the target track and a reduction in access time.

In addition, even if extraneous noise not related to traverse information occurs on the track-crossing signal and mirror signal, counting errors caused by this noise are prevented, enabling accurate track counting, thus enabling a simplification of the waveshaping circuit used to generate the track-crossing signal and mirror signal, thereby enabling a reduction in the size of the circuit.

What is claimed is:

1. A track-counting apparatus for an optical disk, comprising:

an optical detecting head which detects light reflected from an optical disk, a first waveform-generating circuit connected to said head and which detects a tracking-error signal showing a skew of a beam spot from a track, from a playback signal output from said head and generates a track-crossing signal by a binary quantization of said tracking-error signal at a point of zero crossing of said tracking error signal;

a second waveform-generating circuit connected to said head and which generates, from said playback signal output from said head, a mirror signal that indicates a mirror-surface area between tracks of said optical disk; and a track counter connected to said second waveform-generating circuit and which counts a number of tracks traversed by a spot beam which strikes a surface of an optical disk, when it is moved in a radial direction of the optical disk, in response to both said track-crossing signal and said mirror signal, and wherein said track counter further comprises:

an edge-detection circuit which detects an edge of said track-crossing signal and generates an edge-crossing signal;

a logical product circuit which takes a logical product of said edge-crossing signal generated by said edge-detection circuit and said mirror signal, and generates an effective edge signal; and a counter for counting the number of tracks traversed by said spot beam, in response to said effective edge signal wherein said track counter further comprises a seek direction discriminating circuit which determines a seek direction of said head by judging from a target track and a current track position of said head.

2. A track-counting apparatus for an optical disk, comprising:

an optical detecting head which detects light reflected from an optical disk, a first waveform-generating circuit connected to said head and which detects a tracking-error signal showing a skew of a beam spot from a track, from a playback signal output from said head and generates a track-crossing signal by a binary quantization of said tracking-error signal at a point of zero crossing of said tracking error signal;

a second waveform-generating circuit connected to said head and which generates, from said playback signal output from said head, a mirror signal that indicates a mirror-surface area between tracks of said optical disk; and a track counter connected to said second waveform-generating circuit and which counts a number of tracks traversed by a spot beam which strikes a surface of an optical disk, when it is moved in a radial direction of the optical disk, in response to both said track-crossing signal and said mirror signal, and wherein said track counter further comprises;

an edge-detection circuit which detects an edge of said track-crossing signal and generates an edge-crossing signal;

a logical product circuit which takes a logical product of said edge-crossing signal generated by said edge-detection circuit and said mirror signal, and generates an effective edge signal; and a counter for counting the number of tracks traversed by said spot beam, in response to said effective edge signal, wherein said track counter further comprises a seek direction discriminating circuit which determines a seek direction of said head by judging from a target track and a current track position of said head, and wherein said track counter further comprises a direction discriminating circuit connected to said first waveform-generating circuit and said seek direction discriminating circuit and which generates a pulse-discriminating signal from said track-crossing signal in response to an output of said seek direction discriminating circuit.

3. A track-counting apparatus for an optical disk according to claim 2, wherein said track counter further comprises a count pulse separating circuit connected to said logical product circuit and said direction discriminating circuit and which separates said effective edge signal into a count-down signal and count-up signal, in response to said pulse-discriminating signal output from said direction discriminating circuit so as to be supplied to said counter.

4. A method for counting a number of tracks for an optical disk utilizing a track-counting apparatus comprising an optical detecting head which detects light reflected from an optical disk, a first waveform-generating circuit connected to said head and which detects a tracking-error signal showing a skew of a beam spot from a track, from a playback signal output from said head and generates a track-crossing signal by binary quantization of said tracking-error signal, a second waveform-generating circuit connected to said head and which generates, from said playback signal output from said head, a mirror signal that indicates a mirror-surface area between tracks of said optical disk and a track counter connected to said second waveform-generating circuit and which counts the number of tracks traversed by a spot beam which strikes a surface of the optical disk, when it is moved in a radial direction of the optical disk, in response to both said track-crossing signal and said mirror signal, wherein said method comprises the steps;

generating an edge-crossing signal by detecting an edge of a track-crossing signal;

generating an effective edge signal by taking the logical product of said edge-crossing signal and said mirror signal;

separating said effective edge signal into a count-down signal and a count-up signal, in response to information representing a seek-direction of said optical head; and counting a number of tracks traversed by said head in a radial direction of said optical disk utilizing at least one of said count-down signal and said count-up signal.

* * * * *